Figure 1:
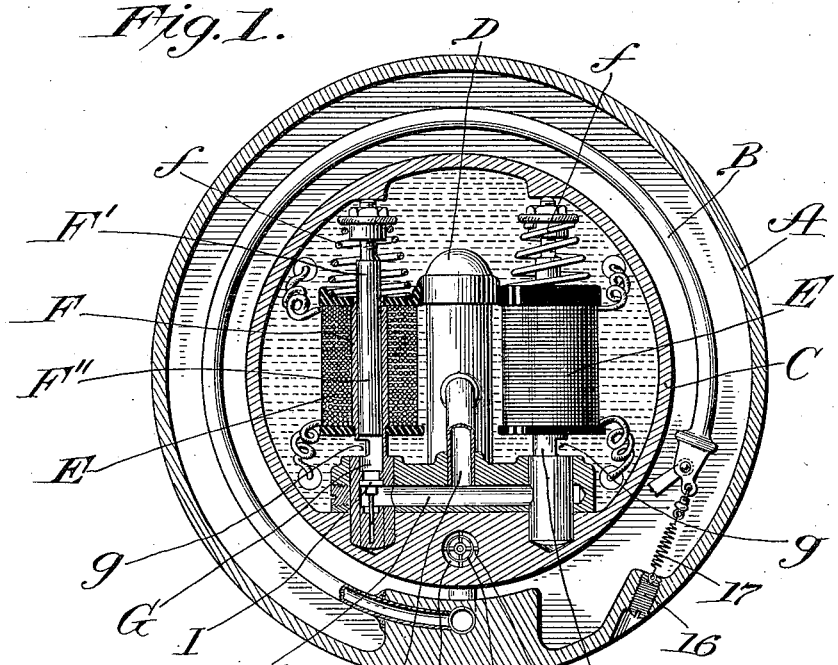

T. T. GAFF.
TACHOMETER.
APPLICATION FILED APR. 20, 1914.

1,134,951.

Patented Apr. 6, 1915.

2 SHEETS—SHEET 1.

Witnesses
P. J. Gathmann
C. H. Potter

Inventor
Thomas T. Gaff
By Byrnes Townsend Birckenstein
Attorneys

T. T. GAFF.
TACHOMETER.
APPLICATION FILED APR. 20, 1914.

1,134,951.

Patented Apr. 6, 1915.
2 SHEETS—SHEET 2.

Witnesses
P. J. Gathmann
C. H. Potter

Inventor
Thomas T. Gaff
By
Byrnes Townsend Brickenstein
Attorneys

UNITED STATES PATENT OFFICE.

THOMAS T. GAFF, OF WASHINGTON, DISTRICT OF COLUMBIA.

TACHOMETER.

1,134,951.  Specification of Letters Patent.  Patented Apr. 6, 1915.

Application filed April 20, 1914. Serial No. 833,290.

*To all whom it may concern:*

Be it known that I, THOMAS T. GAFF, a citizen of the United States, residing at Washington, in the District of Columbia, have invented certain new and useful Improvements in Tachometers, of which the following is a specification.

My invention relates to a tachometer and has for its object to produce an instrument of a type which shall be accurate in its indications, readily applied to the rotating or reciprocating object whose speed is to be measured, and simple in construction.

As is well known, the speed of a revolving or otherwise moving object may be indicated by causing this object directly or indirectly to circulate a fluid under pressure against a spring connected with an indicating-hand playing over a graduated dial. As hitherto constructed, this form of tachometer has the disadvantage that it is often difficult, and in many cases impossible, to install; the dimensions and weight of the circulating mechanism being necessarily such as to hinder or prohibit convenient attachment to the object whose speed of revolution is to be measured. Moreover, if the indications are to be read elsewhere than in close proximity to the moving object, such as a rotating shaft, the carrying of the circulating fluid through the necessary pipes or conduits to the indicating device presents serious difficulties, especially in the case of considerable distances. Electric tachometers have been devised to obviate this difficulty of transmitting the indications to a distance. In this type of instrument, a dynamo-electric generator attached to the revolving object is intended to produce a current proportional to the speed of movement, which current is then carried to an electric meter calibrated to read in terms of revolutions. While this type of instrument enables indications to be readily sent to a distance, the dimensions and weight of the generator offer the same difficulties of attachment as the fluid circulating mechanism. Furthermore, accidental disturbances causing even small variations in the strength of the electric current delivered to the meter, produce great inaccuracies of indication.

It is the object of my invention to overcome these various defects.

Speed of revolution may be accurately indicated through a succession of impulses imparted by the revolving object, if such impulses are maintained substantially equal in value and the indications of the speed of revolution may be carried to any desired distance by transmitting and reproducing electrically the equal values of the impulses with a frequency proportioned to the speed of the revolving object. To accomplish this result, I attach to and drive from any revolving object, such as a rotating shaft, a circuit controller arranged to open and close an electric circuit with a frequency proportioned to the speed of the revolving object to which it is attached. To this circuit controller are led wires from any suitable source of electricity and from it are led wires to a fluid-circulating and speed-indicating device, placed at any desired distance from the revolving object. This circuit controller can readily be made of such dimensions and weight that neither it nor its connecting wires need offer any serious difficulty of attachment, thus avoiding one of the disadvantages found in the other types of tachometers.

In order that the electrical impulses from the circuit controller may be transmitted and reproduced in substantially equal value and with their initial frequency, there are made to energize electromagnetic pumping-devices arranged to impart circulating impulses to the fluid, each of substantially equal value with the other, with a frequency of succession proportioned to the speed of the object whose revolutions are to be indicated.

My invention further relates to means for providing equal and accurate scale indications at both low and high speeds of the revolving object.

Figure 2:
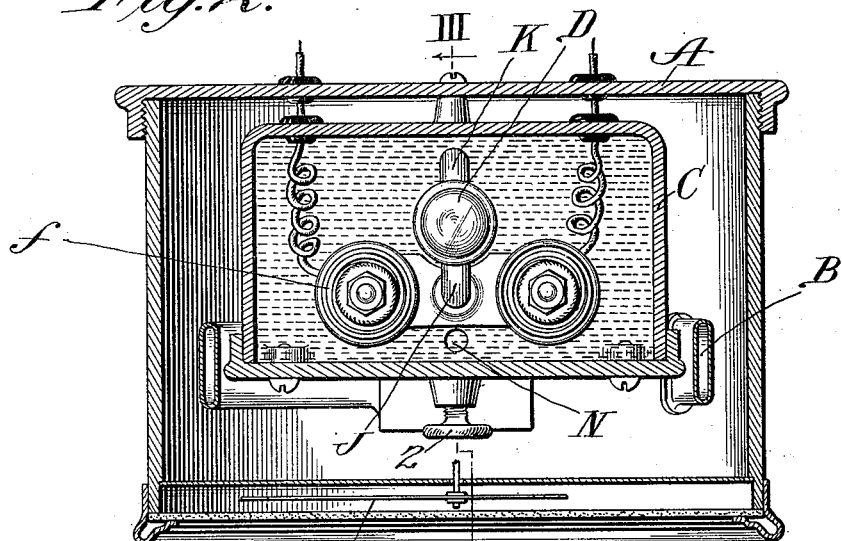
Figure 3:
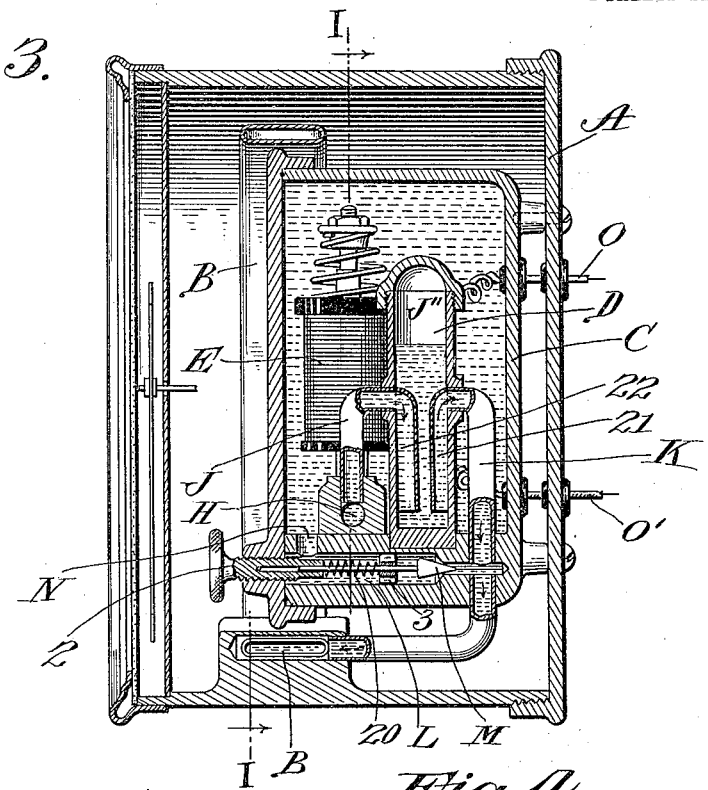

In the accompanying drawings—Figure 1 is a vertical section on the plane I—I of Fig. 2; Fig. 2 is a horizontal section on an irregular plane, looking down on the pumping apparatus; Fig. 3 is a vertical section on plane III—III of Fig. 2; and Fig. 4 is a diagram showing the circuit breakers, in perspective, and the electrical connections.

Referring to the drawings, the indicating-mechanism is contained in a casing A within which is mounted a Bourdon spring B connected to an indicating-finger B' in the usual way. Within the casing A is a closed vessel C containing fluid, such as oil. Within the vessel C is an air chamber D to which are connected electrically-actuated pumping-devices, consisting of solenoids E, E, which operate pistons F, F, having their upper portions F' of magnetic material and their lower portions F'' of non-magnetic material. The lower parts of the solenoid coils act as plungers or pistons working in cylinders G, G, provided with ports g, g. The fluid is delivered from each piston through a check-valve I into a common delivery-pipe H connected with the air chamber D through pipe J. The chamber D is provided with traps 21, 22, to prevent exit of air from the chamber in case the instrument should be reversed.

Fluid is delivered from the chamber D through the pipe K leading to the interior of the Bourdon spring B. Extending laterally from the pipe K is a branch pipe L within which is located the controlling valve M. The fluid returns through the pipe N to the main body of liquid in the closed vessel C. The valve M is normally held to its seat by a spring which is adjusted by suitable mechanism, such as that shown in Fig. 3, comprising a screw-threaded rod 2, in the end of which is mounted the stem of the valve. Secured in the pipe L is a spider or guide 3 through which the stem of the valve passes, and between the end of the rod 2 and spider 3 is mounted a light spiral spring 20.

Figure 4:
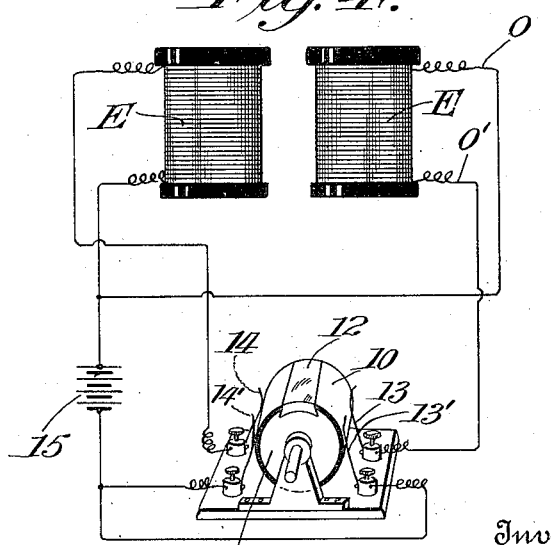

As shown in Fig. 4, the circuit controller consists of an insulated sleeve 10 which may be directly mounted on the rotating shaft 11, this sleeve 10 carrying a conducting portion 12 arranged to engage pairs of springs 13, 13' and 14, 14'. 15 is a battery in circuit with the solenoids E, E, the circuits being so arranged that when contact is made between the springs 13, 13' by the passage thereunder of the conducting portion 12, the right-hand solenoid is energized, and when the circuit is completed through the springs 14, 14', the left-hand solenoid E will be energized.

Referring to Fig. 1, 16 is a screw plug having attached thereto a spring 17 whose other end is attached to the end of the Bourdon spring B to enable adjustment of the Bourdon spring.

The operation is as follows:—Whenever current passes from the circuit controller to one of the solenoids E, E, it is energized and the iron portion of its plunger or piston is drawn down, forcing the non-magnetic portion into the pump cylinder G and driving the fluid therein contained into the air chamber D; the electric circuit then being broken, the magnet is deënergized and the plunger is drawn back by the recoil of the spring f, in readiness for another stroke.

It is to be noted here that by this arrangement, impulses of equal value are imparted to the circulating fluid and that no variation in the strength of the electric current, within operative limits, can cause any variation in the value of these impulses. With a weak current, the operation of the plunger will be somewhat slower, and with a strong current, somewhat more rapid, but in either case, precisely the same amount of fluid would be moved and therefore, each impulse imparted to the fluid would be of equal value to the impulse preceding or following. From the air chamber D, fluid passes out, under pressure, through the pipe K to the Bourdon spring B, thereby causing the spring to expand and move the pointer B' over the dial, as is usual in Bourdon gages. A portion of the fluid, however, passes through the valve M, pipe L, and pipe N, back to the reservoir C, the amount thereof depending upon the tension of the spring in controlling said valve. This tension is regulatable by means of adjusting-rod 2, and by proper adjustment, any given frequency of impulses imparted to the circulating fluid may cause the indicating-hand attached to the Bourdon spring B to stand at any desired point on the dial scale, thus permitting exact calibration. With an entire cessation of impulses, the Bourdon spring retracts and empties itself of its contents through its inlet pipe through the valve M back into the reservoir C.

In Fig. 4, I have shown two pairs of brushes, to form the electrical connections for the two electromagnetic pumps, but of course any desired or convenient number of either may be used, and for the close indications of low speeds, it may be desirable to increase the number of both. It will also be understood that while I have shown plunger pumps, any other type may be used, provided that it permits a sharp and definite separation of each impulse from the others and causes impulses to be of equal value with each other. It is further obvious that instead of solenoids, electromagnets of any other suitable type may be used, and that while I have illustrated the various parts of the apparatus in detail, I do not limit myself to the exact form or disposition of these features.

I claim:—

1. A tachometer comprising fluid-pressure-operated indicating mechanism and electrically-operated mechanism for delivering equal quantities of fluid to said indicating-mechanism, and means operated by a moving object for successively opening and closing the circuit to said electrically-operated mechanism.

2. A tachometer comprising a reservoir for fluid, a Bourdon spring, a conduit connecting the reservoir and Bourdon spring, a return pipe connecting the conduit and reservoir, and means for successively forcing equal quantities of fluid from the reservoir into the conduit.

3. A tachometer, comprising a reservoir for fluid, a pressure-indicating mechanism, a conduit connecting the reservoir and pressure-indicating mechanism, means comprising an electrically actuated pump for successively forcing equal quantities of fluid from the reservoir into the conduit, and means operated by a moving object for successively opening and closing the circuit to said electrically operated mechanism.

4. A tachometer comprising a reservoir for fluid, a Bourdon spring, a conduit connecting the reservoir and Bourdon spring, a return pipe connecting the conduit and reservoir, and means comprising an electrically-actuated pump for successively forcing equal quantities of fluid from the reservoir into the conduit.

5. A tachometer comprising a reservoir for fluid, a Bourdon spring, a conduit connecting the reservoir and Bourdon spring, a return pipe connecting the conduit and reservoir, an adjustable valve controlling flow of fluid through said pipe, and means comprising an electrically-actuated pump for successively forcing equal quantities of fluid from the reservoir into the conduit.

6. A tachometer comprising a fluid reservoir, a Bourdon spring, an air pressure chamber, an electrically-operated pump constructed to successively deliver equal quantities of fluid from the reservoir to the air chamber, a conduit connecting the air pressure chamber to the Bourdon spring, and a spring-valve-controlled passage connecting the conduit to the reservoir.

7. A tachometer, comprising a fluid reservoir, a closed fluid circuit comprising an electrically actuated pump constructed to successively deliver equal quantities of fluid, a conduit connected to the pump, and a return pipe from said conduit to said reservoir, and a pressure-indicating device connected to said conduit.

8. A tachometer comprising a fluid reservoir, a closed fluid circuit comprising an electrically-actuated pump constructed to successively deliver equal quantities of fluid, an air pressure chamber, a conduit connected to the pump, and a return pipe from said conduit to said reservoir, and a pressure indicating device connected to said conduit.

9. A tachometer, comprising a fluid reservoir, a closed fluid circuit comprising an electrically actuated pump constructed to successively deliver equal quantities of fluid, a conduit connected to said pump, and a return pipe from said conduit to said reservoir, a pressure-indicating device connected to said conduit, a rotating object, and means operated thereby to open and close the electrical circuit to the pump-actuating means.

10. A tachometer comprising a fluid reservoir, a closed fluid circuit comprising an electrically-actuated pump constructed to successively deliver equal quantities of fluid, an air pressure chamber, a conduit connected to the pump, and a return pipe from said conduit to said reservoir, a pressure-indicating device connected to said conduit, a rotating object, and means operated thereby to open and close the electrical circuit to the pump-actuating means.

In testimony whereof I affix my signature in presence of two witnesses.

THOMAS T. GAFF.

Witnesses:
   Jos. H. Blackwood,
   Charles H. Potter.

Copies of this patent may be obtained for five cents each, by addressing the "Commissioner of Patents, Washington, D. C."